Feb. 23, 1965     L. E. PURDY     3,170,263
FISHING LURE
Filed May 6, 1963

INVENTOR.
Loren E. Purdy
BY
Dale A. Winnie
ATTORNEY

United States Patent Office 3,170,263
Patented Feb. 23, 1965

3,170,263
FISHING LURE
Loren E. Purdy, 2920 Lake Angelus, Pontiac, Mich.
Filed May 6, 1963, Ser. No. 278,185
2 Claims. (Cl. 43—42.04)

This invention relates to fishing lures in general and more particularly to lures for fishing in and about weed beds or the like.

Most fishing lures are equipped with fishhooks disposed in a rearward free hanging relation behind the lure where they can swing to and fro. The prongs of the hooks are disposed forwardly so that any obstruction encountered or fish taking the lure will be caught on the hooks and held in the bights thereof. Some lures are even made to obtain a fishtail action in the water to attract the fish and to intentionally swing the hooks for better grappling hook action.

The ordinary type of fishing lure is thus not suited for fishing in or about weed beds because of the tendency of the hooks to become entangled with weeds and to be ineffectively obscured or to catch in the weeds and to cause a strain and likely to break the fishing line.

Numerous attempts have been made to provide a true weed-free lure for weed bed fishing. However, the lures devised have usually been of special design and have not always been too attractive to the fish. In many instances they have been quite complicated to make and accordingly too expensive for the general public.

Most so-called weed free lures have proposed carrying the hooks further forward on the lure and providing some means to shield the forwardly disposed ends of the hook or hooks. Many have proposed snap-open safety pin like shields or the like provided either on the hooks themselves or having the shields or guides provided directly on the lure.

The shortcomings of these schemes are obvious.

For best affect, a lure should have its hooks connected at or near the end to prevent obstruction by the lure and damage thereto or to the hooks. This is also advisable when the hooks are adapted to swing back and forth to guard against any underwater noise. A still further reason is to provide for an end strike which is most common. Any intermediate disposition of the hooks presents these problems.

It will also be appricated that a hook which is attached to the body of a lure and does not swing free will be partially obscured and therefore ineffective in many respects.

Special hooks and safety guards, whether on free hanging hooks or the lure, are of questionable use since they must either trigger or trip the hook free for use, or be so light as to allow even weeds to pass and catch in the bight of the hook as before. Even if successfully devised on a free hanging hook, the hooks still catch weeds between each other in their twisting and turning action in the water.

It is an object of this invention to provide a truly weed free and snare proof fishing lure.

It is an object of this invention to provide a lure having means for mounting a fishhook thereon and adapted to carry the hook backwards in the water with the hook and bight thereof disposed rearwardly.

It is an object of this invention to provide a lure including a weed guard receptive of the fishhooks in protective relation thereto, when not in use, and causing no obstruction to the free swinging action of the hooks when called into service.

It is an object of this invention to provide a weed guard or shield including means for retaining a trailing hook in a backwards disposed relation and one which may be adapted for use with most conventional type fishing lures.

To be more specific, it is an object of this invention to provide a lure or an adaptation particularly suited for a flat surfaced type lure, whereby a conventional three-prong fishhook may be connected to the end thereof, laid on the spoon type lure and held lightly with its hook ends disposed rearwardly in the shielded protection of a guide or guard and in a manner that will not interfere with the motion of the lure nor the release and swinging action of the hook when a fish strikes.

Another object of this invention is to disclose a special type of fishhook particularly suited for use with the lure proposed.

These and other objects and advantages to be gained in the practice of this invention will be better understood and appreciated upon a reading of the following specification in regard to a preferred embodiment of the invention and having reference to the accompanying drawings wherein.

Figure 1:
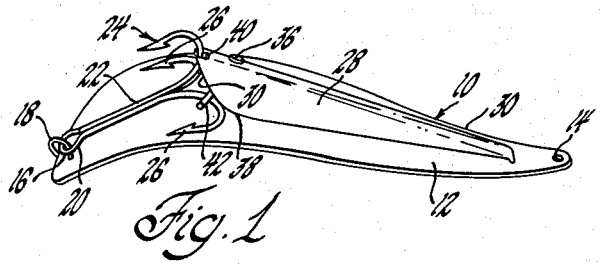
FIGURE 1 is a perspective view of the fishing lure of this invention.
Figure 3:
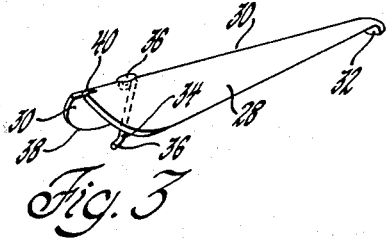
FIGURE 3 is a perspective view of the weed guard or shield member of this invention.
Figure 2:
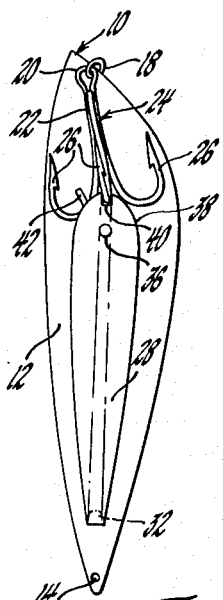
FIGURE 2 is a top plan view of the fishing lure of this invention.

The fishing lure 10 shown by the drawing is of the flat surfaced type including a body member 12 having the lead line end tapered, turned up slightly and provided with a hole 14 for the lead line attachment to the fishing line. The after or trailing end of the lure is turned down and provided with a hole 16 near one side edge for attachment of the fishhook. The trailing end of the lure is also formed to obtain a twisting or fishtail action as the lure is pulled through the water by having one side edge curved in a conventionally known manner.

A small ring 18 is provided through the hole 16 and through the eyelet 20 formed in the shank 22 of a three-prong fishhook 24. The actual hooks 26 are formed over the shank about 120° apart as is commonly known.

Although a special type of hook may be used, as will later be described, the conventional form of a three-prong or grappling hook type of fishhook is also usable and being more readily available is so shown.

A shield or guard member 28 is provided on one of the side faces of the body 12 of the lure. It is an inverted and V-shaped member tapered to a point at one end, as received on the lure, and having the other end 30 left open. The tapered end is formed to include a tab 32 received through a slot in the lure and crimped under to hold that end to the body of the lure. Fastener means 34 is provided near the open end of the shield member 28 and has opposite ends 36 spot welded or received through slots in the crest of the shield and the body of the lure and crimped over, to hold the parts together.

The shield or guard member 28 has the lower corners at the open end cut back, as at 38, to receive two of the hooks 26 thereunder and includes a slot 40 at the peak for the third hook. This slot serves to receive the back of the bight of one of the hooks 26 therein when the multiple hook 24 is laid on the body of the lure as will be described.

Figure 4:
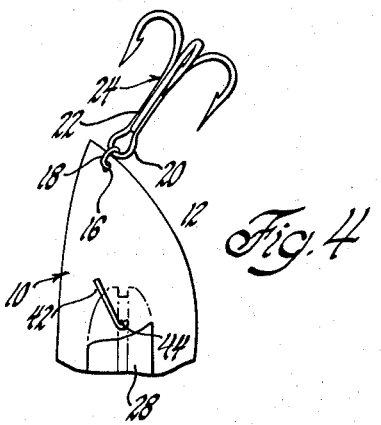
FIGURE 4 is a top plan view of a fragmentary section of the lure of this invention having a part broken away to better show a significant detail and with the hook shown in a free swinging and trailing disposition.

A spring wire member 42 is secured by a rivet or other fastener means 44 to the body portion 12 within the protection of the guard or shield 28 and is extended as a spring finger from the open end thereof; as best shown by FIGURE 4.

Figure 5:
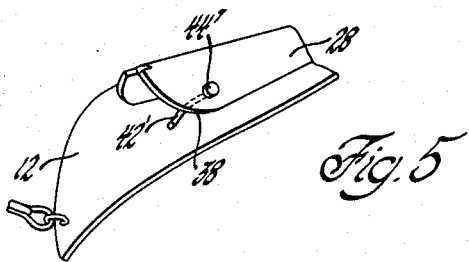
FIGURE 5 is a perspective and fragmentary view of a lure showing a modified form of this invention.

The spring wire clip or finger member may also be provided on the shield or guard member 28 as is shown by FIGURE 5; where the spring finger or clip member is identified by the numeral 42' and the retainer means by the numeral 44'.

Figure 6:
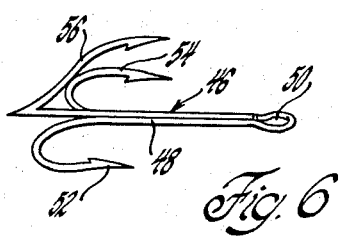
FIGURE 6 is a perspective view of a special fishhook particularly suited for use in the practice of this invention.

FIGURE 6 shows the special hook which was mentioned previously and is identified by the numeral 46. This hook includes a shank 48 having an eyelet 50 formed in the end thereof, in the conventional manner, and with a pair of hooks 52 and 54 which are disposed in parallel and coplanar relation on opposite sides of the shank of the hook to lie flat with the shank for an advantage which will later be appreciated. It also has another hook 56 disposed at right angles and upstanding over the others.

In passing, it will be appreciated that the structure shown and described thus far may be duplicated on the other side of the lure 10. Also that the guard 28 and spring finger member 42 or 42' may be separately provided for adaptation of this or any other type lure to include this invention.

As adapted for use, the lure 10 has the hook 24 received in the manner shown by FIGURE 1 with the shank 22 disposed forwardly and the hooks 26 disposed rearwardly. Two of the hooks 26 rest on the body 12 and the upstanding hook is received within the notch or slot 40 provided in the shield or guard 28. This centers the hook and disposes one or the other hook portions for engagement under the spring finger member 42. The hook is accordingly disposed and retained against free swinging action while the lure is traveling in the water and with the hooks disposed both in a shielded relation to the guard 28 and extended rearwardly in a manner less prone to catch or pick up any weeds.

It will be appreciated that the notch 40 in the guard serves to center the hook for engagement by the spring finger 42 but that the eyelet of the hook allows end movement and the hook is free to swing out of its retained position when a strike is made. Likewise, it will be appreciated that the retaining bias of the spring finger 42 is very light and only such as is needed to hold the hook while the lure is traveling through the water.

The impact of a strike on the lure causes the hook to be automatically released and to swing out with the grappling hook effect to lodge itself in the mouth of a fish.

The special hook 46, with the parallel hook parts 52 and 54 will lie more flat against the body portion 12 of the lure and has some distinct advantages in being easier to shield. However, the conventional type of fishook 24 is equally adaptable for use.

Although I have shown a lure having this invention provided thereon, it will be appreciated that the invention is inclusive of the adaptation alone and that a separate guide or guard 28 with a spring finger clip provided therewith or attached thereto might be made available to fishermen so that they might in turn adapt their favorite fishing lure to include this innovation.

It will also be appreciated that although a preferred embodiment of this invention has been shown and described in detail, other lures may be adapted to include this invention and certain modifications and improvements are foreseeably within the scope of the invention set forth. Accordingly, such of these improvements and modifications as are not specifically excluded by the language of the hereinafter appended claims are to be considered as inclusive thereunder.

I claim:
1. A fishing lure, comprising:
a flat surfaced member turned up at one end and down at the other end and having side edge portions curved to provide a fishtail action when pulled through the water,
an elongated member tapered toward said one end and having a forward end connected to one side surface of said flat surfaced member and having the after end standing thereover,
a three-prong fishhook pivotally connected to said other end of said flat-surfaced member for free swinging and trailing action therebehind,
said fishhook being susceptible to being disposed forwardly toward said one end on said flat surfaced member with the prong ends thereof disposed rearwardly toward said other end,
one of the prongs of said fishhook being disposed upwardly and in engagement with the after end of said tapered member and the other of said prongs laying on said flat surfaced member,
and spring finger means extended from said tapered member for light retaining engagement with one of said other prongs and holding said fishhook in forward disposition.
2. The fishing lure of claim 1,
said fishhook having said other prongs formed to lie flat on said flat surfaced member.

References Cited by the Examiner
UNITED STATES PATENTS

| | | | |
|---|---|---|---|
| 861,116 | 7/07 | Heddon | 43—42.04 |
| 2,235,000 | 3/41 | Albers | 43—42.5 |
| 2,503,369 | 4/50 | Wycech | 43—42.41 |
| 2,597,035 | 5/52 | Rickard | 43—42.4 |
| 2,629,199 | 2/53 | Larson | 43—42.41 |
| 2,746,200 | 5/56 | Dale | 43—42.04 |

ABRAHAM G. STONE, *Primary Examiner.*